United States Patent [19]

Ragsdale

[11] 4,284,290

[45] Aug. 18, 1981

[54] BICYCLE LOCK

[76] Inventor: Fred L. Ragsdale, Rte. 1, Box 424F, Weed, Calif. 96094

[21] Appl. No.: 75,610

[22] Filed: Sep. 14, 1979

[51] Int. Cl.³ .............................................. B62H 5/10
[52] U.S. Cl. .................................... 280/289 L; 70/236
[58] Field of Search .............. 280/289 L, 297; 70/233, 70/234, 235, 236, 49, 62, 58; 224/30 R

[56] References Cited

U.S. PATENT DOCUMENTS

| | | | |
|---|---|---|---|
| 3,910,602 | 10/1975 | Lindner | 280/289 L |
| 4,007,614 | 2/1977 | Schott et al. | 280/289 L X |

Primary Examiner—David M. Mitchell
Assistant Examiner—Randall A. Schrecengost
Attorney, Agent, or Firm—Phillips, Moore, Weissenberger, Lempio & Majestic

[57] ABSTRACT

A lock for a bicycle wherein a locking cable is stored in an upwardly extending frame tube of the bicycle. A weight on the cable within the frame tube has a triple function, in that: it prevents the cable from being pulled completely out of the frame tube when the bicycle is being locked; it pulls the cable back into the frame tube when not in use; and, it jams the pedal crank shaft against operation in the event a thief should cut the cable when the bicycle is locked.

10 Claims, 3 Drawing Figures

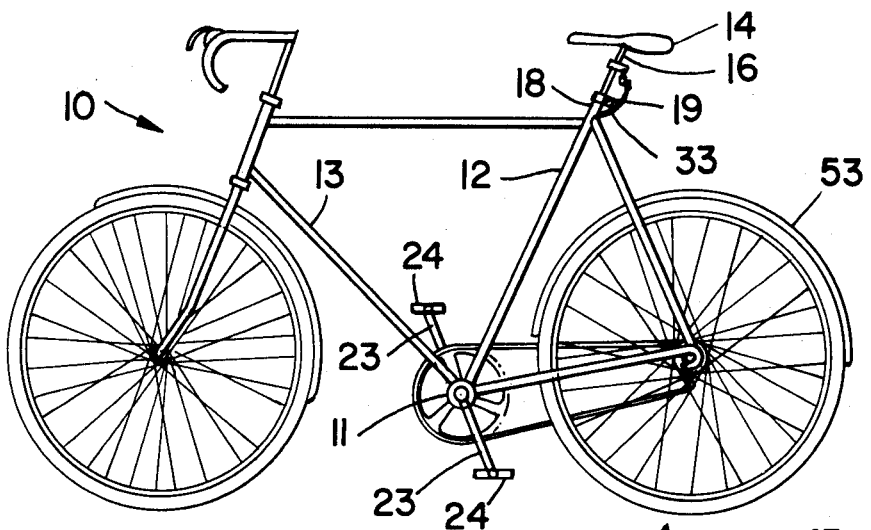
FIG_1
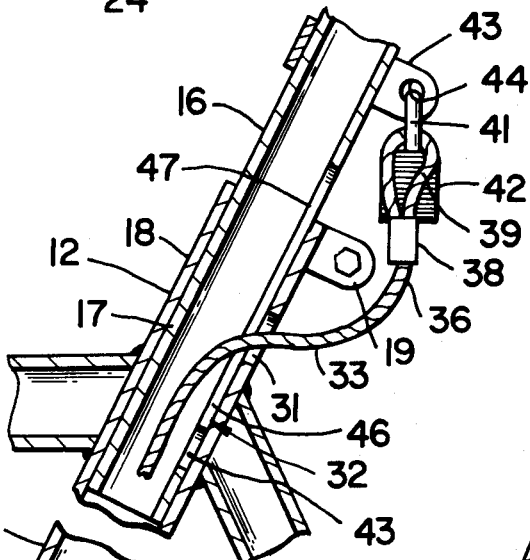
FIG_2
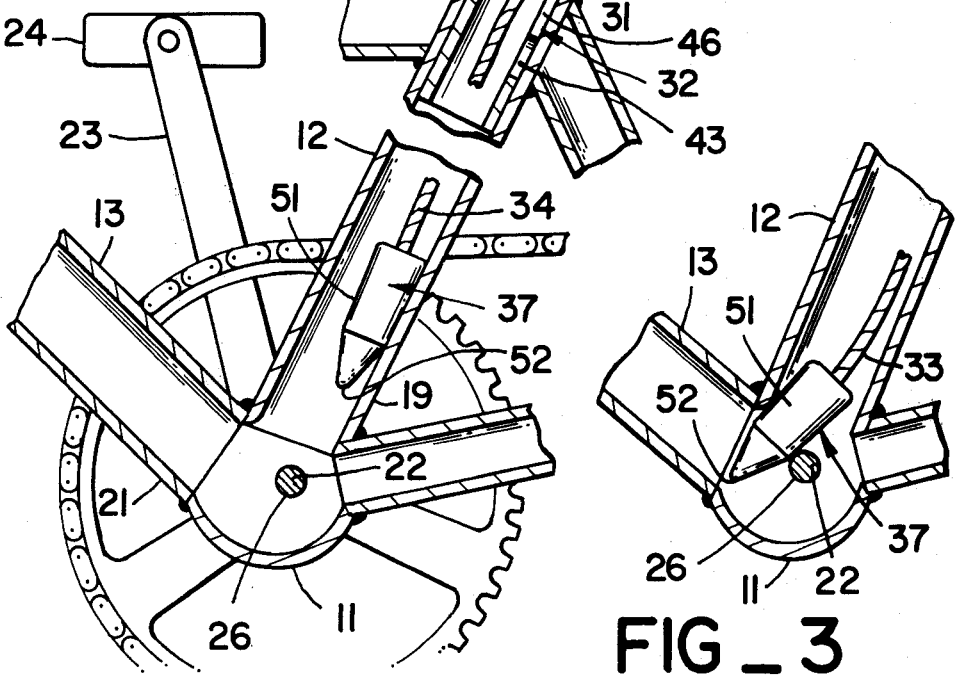
FIG_3

BICYCLE LOCK

BACKGROUND OF THE INVENTION

This invention relates to locks for bicycles, and more particularly for bicycles having a tubular frame constructions.

A common practice, at the present time, is to lock unattended bicycles by use of a cable which passes around a portion of the bicycle and a post or small tree, with the ends of the cable being then locked together to prevent theft of the bicycle.

Usually, after the cable is unlocked, it is wrapped around the seat support tube, or around some other part of the bicycle frame, for storage during the time the bicycle is in use. Such storage is bothersome and time consuming, and the presence of the cable detracts from the appearance of the bicycle.

Efforts have been made to store the cable inside one of the tubular frame members of the bicycle when the cable is not in use. Examples of such efforts are shown in: U.S. Pat. No. 2,051,822 to Clark, issued on Aug. 25, 1936; U.S. Pat. No. 3,910,602 to Lindner, issued on Oct. 7, 1975; and U.S. Pat. No. 4,007,714 to Treslo, issued on Dec. 27, 1977. However, each of the systems of these patents require that the user physically push, or stuff, the cables into the frame member, which again is a time-consuming annoyance for the user.

Another problem with the presently used cable locking system is that the locked bicycle is safe only as long as the cable is intact. A thief with a bolt cutter can quickly, and surreptiously, cut the cable and then ride off on the bicycle without attracting much, if any attention.

SUMMARY OF THE INVENTION

The present invention is directed towards solving one or more of the above problems.

In one aspect of the invention, a flexible locking cable extends through an opening in one of the frame tubes with a first end inside the frame tube and a second end outside of the frame tube, the cable having a first stop member to limit the amount that the cable can be pulled out by the user from the frame tube and a second stop member to limit the amount that the cable can be pulled back into the frame member (when the cable is to be stored), and bias means to pull the cable back into the frame tube, so that little time or effort is required by the user to store the locking cable when not in use.

A further aspect of the invention is that the frame tube of the bicycle opens into the pedal crank housing therebelow and that the first end of the cable has a jamming member thereon. If the bicycle is locked, and the cable is cut, the jamming member will descend into the pedal crank housing and jam the pedal crank so that the bicycle can not be pedal-driven.

Other aspects and advantages of the invention will be apparent in the course of the following detailed description.

BRIEF DESCRIPTION OF THE DRAWINGS

In the drawings, forming a part of the application, and in which like parts are designated by like reference numerals throughout the same, FIG. 1 is an elevational view of a bicycle utilizing the present invention.

FIG. 2 is a sectional view of the portion of the frame of the bicycle of FIG. 1 in which the present invention is used.

FIG. 3 is a sectional view, of a portion of FIG. 2, illustrating the jamming of the pedal crank shaft in the event the locking cable is cut.

DESCRIPTION OF THE PREFERRED EMBODIMENT

Referring now to the drawings, wherein is shown a preferred embodiment of the invention, FIG. 1 illustrates a typical bicycle 10 having a pedal crank housing 11, and frame tubes 12 and 13 extending upwardly from the pedal crank housing 11. Seat 14 is carried by seat support tube, or post, 16, the lower end 17 of the latter being telescoped into the upper upper end 18 of frame tube 12 and adjustably fixed as to height by clamp 19.

As seen in FIG. 2, frame tubes 12 and 13 open at their lower ends, 19 and 21, respectively, into pedal crank housing 11. Pedal crank shaft 22 extends horizontally through the pedal crank housing 11 and has crank arms 23 at its ends to which the pedals 24 are attached. In conventional bicycle manufacture, the pedal crank shaft 22 has a rough, unfinished, outer surface 26.

The bicycle 10 as described above can be adapted for use with the present invention by forming opening 31 laterally through frame tube 12 at the upper end thereof and an elongated slot 32 laterally through and lengthwise of the lower end 17 of the seat support tube 16. The slot 32 is oriented so that the opening 31 will be in registration therewith when the seat 14 is in normal fore-and-aft alignment with the bicycle frame.

A flexible locking cable 33 extends through the frame tube opening 31 and seat support tube slot 32, and has a first end 34 disposed within the frame tube 12 and second end 36 disposed outside of the frame tube 12. Cable 33 is preferably formed from standard, stainless-steel, aircraft-control cable for maximum strength, hardness and flexibility.

The first end 34 of cable 33 has a weight 37 permanently fixed thereto, the weight 37 having a mass which is relatively high as compared to the mass of the cable 33. For example, the weight 37 may weight in the order of a half a pound. The second end of the cable is doubled back upon itself and permanently fixed thereto by cable clamp 38 to form an end loop 39 to which the shackle 41 of lock 42 may be attached.

A bracket 43, secured to seat support tube 16, has an opening 44 therethrough large enough for the shackle 41 of the lock 42 to pass therethrough.

In the event the cable 33 has the cable clamp 38 secured thereto before installation, the frame tube opening 31 should have a large enough diameter so that the cable clamp can pass therethrough. Likewise the slot 32 of the seat support tube 16 should have an inverted key hole shape with the lower end 43 being large enough for the cable clamp 38 to pass therethrough, while the portion 46 of slot 32 above the lower end 43 is wider than the diameter of the cable but narrower than the width of the cable clamp 38. With such an arrangement the cable 33 can be inserted into frame tube 12, and the loop 39 and cable clamp 38 can be fished out through the lower end 43 of slot 32 and opening 31 when they are in registration. The seat support tube 16 will then be lowered into frame tube 12 to a normal seating position, with the narrower portion 44 of slot 32 being in registration with frame tube opening 31. Thus, in normal operation, cable clamp 38 will provide a stop means for limiting the amount that the cable 33 can be pulled into the frame tube 12.

If the cable clamp 38 is to be applied to cable 33 after the cable has been threaded through the slot 32 and opening 31, then either the opening 31 can be made smaller in diameter, such that it is larger than the diameter of cable 33 but small enough so that the cable clamp 38 can not pass therethrough, or the slot 32 can be uniform in width from top to bottom thereof to allow the cable 33 to pass freely therethrough while preventing the cable clamp 38 from doing so, or both.

If desired, the cable 33 can pass only through the upper end 47 of slot 32, above the upper end 18 of seat support tube, providing slot 32 is long enough so that the upper end 46 thereof is above the upper end of frame tube 12 where the seat 14 is in its lowest normal position. Such an arrangement will eliminate the need for frame tube opening 31, but will enable a thief to steal the bicycle by loosening clamp 19 and taking the seat support tube 16, cable 33 and weight 37 out of frame tube 12.

The weight 37 provides a triple function in the present invention. First of all, weight 37 is sized so that it is larger than slot 32 and opening 31 so that it cannot pass therethrough. As such, it serves as a stop means for limiting the amount of the cable 33 that can be pulled out of frame tube 12. Secondly, the mass of weight 37 serves as a bias means for pulling the first end 34 of cable 33 through frame tube 12 in a direction to pull the cable 33 into the frame tube 12.

Thirdly, weight 37 is shaped such that the outer surface 47 thereof constitutes a jamming means. In particular the weight 37 is shaped so that its outer surface 51 is tapered, enabling the lower end 52 of weight 31 to enter between pedal crank shaft 22 and pedal crank housing 11, with further entry than causing the weight 37 to jam between the pedal crank shaft 22 and housing 11, as shown in FIG. 3.

The weight 37 is preferably made of lead, since such metal has the high density and softness needed for use in the present invention.

OPERATION

When it is desired to lock the bicycle, lock 42 is opened and removed from storage bracket 43. Cable 33 is then pulled out from within frame tube 12, passed through the rear wheel 53 of the bicycle 10 and around some post or tree, with lock 42 then locking cable loop 39 to the standing part of cable 33.

When the bicycle is unlocked, weight 37 will pull the cable 33 back into frame tube 12 so that little, if any, action on the part of the owner is required. The lock can then be stored on bracket 43, with or without the cable loop 39 being retained by shackle 41 of the lock 42, as shown in FIG. 2, as desired.

The length of cable 33 is such that the weight 37 will be held above the pedal crank shaft 22 when the cable is fully pulled into frame tube 12, i.e., as limited by the stop means provided by cable clamp 38. Thus, as long as cable 33 remains intact, the jamming function of the present invention will not occur.

In the event a thief should cut cable 33 when the bicycle is locked, the weight 37 and severed cable will drop in frame tube 12 and lower the end 52 of the weight will drop onto the rough surface 26 of pedal crank shaft 22. As the thief then tries to ride the bicycle away, the counterclockwise (as viewed in FIGS. 2 and 3) rotation of the crank shaft will move weight 37 so that the tapered lower end drops down past the forward side of the crank shaft 22 to the position shown in FIG. 3. The hard, unfinished surface 26 of the crank shaft will quickly bite into the soft material of the weight and force it downwardly so that it wedges between the crank shaft and housing and jams the crank shaft against further rotation. This jamming will occur rapidly, and the loss of operability will be quite noticable to bystanders. With the bicycle thus made inoperable, all but the most dedicated thief will abandon the bicycle.

The owner can, upon recovery of the bicycle, restore it to operation by taking off the seat support tube 16, inverting the bicycle, and moving the pedals 24 in a backward direction (clockwise as seen in FIGS. 2 and 3) to dislodge the weight 37 from its jamming position and to remove it frame tube 12.

Although the invention has been described above with the cable 33 being stored in the frame tube 12, the cable can be stored in the forwardly extending frame tube 13 and the same functioning will result. However, if frame tube 13 is used, the weight 37 should be somewhat heavier to compensate for the lesser upward inclination of frame tube 13.

I claim:

1. In a bicycle having an upwardly extending frame tube, the improvement comprising:

means forming an opening at the upper end of said frame tube from the interior thereof to the exterior thereof, an elongated flexible cable extending through said opening and having a first end disposed within said frame tube and a second end disposed outside of said frame tube, said cable having a predetermined amount of weight, means comprising first stop means on said cable within said tube for limiting the amount of said cable that can be pulled out from within said frame tube, and further comprising bias means for pulling said first end of said cable through said frame tube in a direction to pull said cable into said frame tube and with a force greater than the weight of said cable outside of said frame tube when said cable has been pulled out from said frame tube to the extent permitted by said first stop means, second stop means on said cable outside of said frame tube for limiting the amount of said cable that can be pulled into said frame tube, attachment means at said second end of said cable for attachment of a lock thereto.

2. The improvement as set forth in claim 1 wherein said bias means comprises a weight secured to said first end of said cable, said weight having a mass which is relatively high as compared to the mass of said cable.

3. In a bicycle according to claim 1, wherein said bicycle has a pedal crank housing and a horizontal pedal crank shaft extending through said housing, there being a space between said pedal crank shaft and said pedal crank housing, wherein said frame tube extends upwardly from said pedal crank housing and wherein said frame tube opens at the lower end thereof into the space between said pedal crank shaft and said pedal crank housing, the improvement further comprising:

said means comprising said first stop means and said bias means further comprising jamming means secured to said first end of said cable and movable through said frame tube and into said pedal crank housing for jamming between said pedal crank shaft and said pedal crank housing upon descent of said jamming means into said pedal crank housing, said cable having a length such that said jamming means is positioned above said pedal crank shaft where said second stop means has limited the amount of said cable that can be pulled into said frame tube.

4. The improvement as set forth in claim 3, wherein said bias means comprises a weight secured to said first end of said cable and said jamming means comprises the outer surface of said weight, said outer surface being tapered to enter between said pedal crank shaft and said pedal crank housing and to then jam between said pedal crank shaft and pedal crank housing.

5. The improvement as set forth in claim 4, wherein said weight and outer surface thereof is lead.

6. In a bicycle according to claim 3 wherein said bicycle has a seat and a seat support tube, said seat support tube being telescoped into the upper end of said frame tube, the improvement further comprising that said means forming an opening forms said opening laterally through at least one of said tubes.

7. In a bicycle according to claim 3 wherein said bicycle has a seat and a seat support tube, said seat support tube being telescoped into the upper end of said frame tube, the improvement further comprising that said means forming an opening forms an opening laterally through the upper end of said frame tube and an elongated lengthwise slot laterally through said seat support tube, said frame tube opening and said seat support tube slot being in registration with each other.

8. The improvement as set forth in claim 7, wherein said bias means comprises a weight secured to said first end of said cable and said jamming means comprises the outer surface of said weight, said outer surface being tapered to enter between said pedal crank shaft and said pedal crank and then to jam between said pedal crank shaft and pedal crank housing.

9. The improvement as set forth in claim 8, wherein said weight and outer surface thereof is lead.

10. The improvement as set forth in claim 9 and further including a bracket secured to said seat support tube, said bracket having an opening therethrough for receiving the shackle of a lock.

* * * * *